United States Patent Office 3,065,241
Patented Nov. 20, 1962

3,065,241
PROCESS FOR PREPARING CERTAIN TETRAZOLES
Ivar Ugi and Rudolf Meyr, Munich, Germany, assignors to Aktiebolaget Astra, Apotekarnes Kemiska Fabriker, a company of Sweden
No Drawing. Filed Jan. 18, 1961, Ser. No. 83,383
11 Claims. (Cl. 260—308)

The present invention relates to a process for preparing compounds which contain the atom grouping

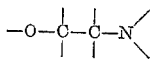

Such compounds are present in a great number of substances and products having varied applications. The process of the invention enables one to manufacture such compounds in a simple and inexpensive manner. These compounds include the derivatives of hydroxy, alkoxy, aralkoxy and aryloxy carboxylic acids, e.g. the amides, thioamides and selenoamides thereof, as well as hydroxyalkyltetrazoles, such as cyclic derivatives of urethane and thiourethane.

According to this invention compounds containing the

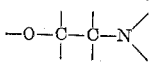

grouping are prepared by reacting isonitriles with carbonyl compounds in the presence of nucleophilic reactants in a medium of appropriate acidity.

Negative-charged or neutral molecules with at least one free pair of electrons are suitable as nucleophilic reaction partners. It is advantageous to employ an azid or a salt thereof as the nucleophilic reaction partner, such as hydrazoic acid or an azide and thiocyanic acid or thiocyanates.

The isonitriles which are necessary for the process of the invention have recently become readily available. (See I. Ugi and R. Meyr, Angewandte Chemie, vol. 70, page 702, 1958.) Aliphatic, aromatic, araliphatic or heterocyclic isonitriles as well as fulminic acid and its salts can be used in the process. Suitable isonitriles include isopropylisocyanide, n-butylisocyanide, tertiary-butylisocyanide, cyclohexylisocyanide, benzlisocyanide, pyridylisocyanide and 2,6-dimethylphenylisocyanide.

Suitable carbonyl compounds include aldehydes and ketones, for example, formaldehyde, acetaldehyde, propionaldehyde, n-butyraldehyde, iso-butyraldehyde, benzaldehyde, ferro-cen-aldehyde, pyridine aldehyde, benzothiazol aldehyde, succinic dialdehyde, 1-azulene-1'-propene-1-al, propenal and the β-aminoacroleins obtained therefrom through the addition of amines; furthermore dimethylaminocinnamaldehyde, glyceraldehyde and other aldoses, β-methylmercaptopropionaldehyde, trifluorobutyraldehyde, β-di-methylamino-pivaldehyde, dimethylketone, methylethylketone, diethylketone, methylpropylketone, ethylpropylketone, dipropylketone, dibutylketone, benzylmethylketone, dibenzylketone and cyclohexanone.

The reaction is most conveniently carried out in acid solution. Of course, one or more of the reactants may possess more than one functional group participating in the reaction.

Further details of the process of the invention are set forth in the following illustrative examples thereof.

EXAMPLE 1

*Preparation of 1-o,o'-Dimethylphenyl-5-Hydroxymethyl-tetrazole*

Forty cc. of a 7.3% solution of hydrazoic acid (68 mMol) in chloroform were mixed with 4 cc. of 40% formalin. Thirty cc. of tetrahydrofuran were added thereto to obtain a homogeneous mixture into which there was introduced 6.56 grams (50 mMol) of 2,6-dimethylphenylisocyanide. After about eight weeks the smell of isonitrile vanished altogether. The slightly yellow solution was concentrated to obtain 10.21 grams of a yellow resin, interspersed by many crystals. This product was stored in a desiccator over phosphorous pentoxide. After rubbing with 20 cc. of ether, 4.44 grams (43% of the total) of colorless thin needles were filtered off with suction. The melting point was 109–111° C. These were recrystallized from benzene. Yield: 3.72 grams (37% of the total). Melting point: 113–114° C. The pure substance melts at 114–115° C.

EXAMPLE 2

*Preparation of 1-Cyclohexyl-5-(1'-Hydroxy-2'-Methyl-1'-Propyl) Tetrazole*

Forty cc. of a 7.3% solution of hydrazoic acid (68 mMol) in chloroform were mixed with 4.33 grams (60 mMol) of freshly distilled isobutyraldehyde. This mixture was ice-cooled and agitated while rapidly adding dropwise thereto 5.45 grams (50 mMol) of cyclohexylisocyanide, whereby the reaction mixture became warmed up. After three days there was no trace of the odor of the isonitrile. By concentrating this slightly yellow solution, there was obtained 10.80 grams (97% of the total) of light yellow thin needles having a melting point of 83–94° C. After crystallizing from cyclohexane, there was obtained 9.54 grams (85% of the total) of colorless needles having a melting point of 94–97° C. The pure substance melts at 97–99° C.

EXAMPLE 3

*Preparation of 1-Cyclohexyl-5-(1'-Hydroxy-2',2',2'-Trichloro-1'-Ethyl) Tetrazole*

Forty cc. of a 7.3% solution of hydrazoic acid (68 mMol) in chloroform were mixed with 7.37 grams (50 mMol) of anhydrous chloral. This mixture was ice-cooled and agitated while rapidly adding dropwise thereto 5.45 grams (50 mMol) of cyclohexylisocyanide, whereby the reaction mixture became hot. After an hour there was no more odor of isonitrile. The solution had an intense yellow color. After concentrating it, there was obtained 13.67 grams (96% of the total) of yellow thin needles having a melting point of 129–151° C. The raw product was dissolved in 150 cc. of benzene and the resulting solution concentrated to about 30 cc. Crystallization was allowed to take place. There was obtained 10.27 grams (72% of the total) of light yellow colored needles, melting at 170–171° C. After repeated recrystallizing the product was colorless.

EXAMPLE 4

*Preparation of 1-o,o'-Dimethylphenyl-5-(1'-Hydroxy-2',2',2'-Trichloro-1'-Ethyl) Tetrazole*

Forty cc. of an 8.4% solution of hydrazoic acid (78 mMol) in benzene were mixed with 7.37 grams (50 mMol) of anhydrous chloral. This mixture was ice-cooled and agitated while rapidly adding dropwise thereto 6.56 grams (50 mMol) of 2,6-dimethylphenylisocyanide. The reaction mixture thereby warmed up somewhat and a thick precipitate was deposited consisting of needles having a yellow color. The residual solution had a dark color. After 6 days the odor of the isonitrile had disappeared. The residual solution was decanted and concentrated to obtain 7.02 grams of a resin having a dark brown color. The raw, yellow crystals (11.48 grams=71% of the total) melted at 168–172° C. The raw product was dissolved in 150 cc. of benzene and then concentrated to about 30 cc. After crystallizing was completed, there was obtained 10.42 grams (65% of the total) of colorless needles having a melting point of 171–173° C.

EXAMPLE 5

*Preparation of 1-p-Diethylaminophenyl-5-(1'-Hydroxy-2', 2',2'-Trichloro-1'-Ethyl) Tetrazole*

Forty cc. of a 7.3% solution of hydrazoic acid (68 mMol) in chloroform were mixed with 7.37 grams (50 mMol) of anhydrous chloral. During a period of ice-cooling and vigorous shaking 8.71 grams (50 mMol) of p-diethylaminophenylisocyanide were gradually added. The reaction mixture developed a dark brown color and became hot. At once needles of a brown color precipitated which were filtered with suction. Yield: 17.27 grams (95% of the total). Melting point: 158–160° C. The pure product, recrystallized from a mixture of benzene and alcohol, melted at 159.5–161° C. Because of self-oxidation, it had a light brown color.

EXAMPLE 6

*Preparation of 1-Cyclohexyl-5-(1'-Hydroxy-1'-Methyl-1'-Ethyl) Tetrazole*

Eighty cc. of a 0.33 molar aluminum azide solution (80 mMol $N_3^-$) in tetrahydrofuran were mixed with 10 cc. of dry acetone. 5.45 grams (50 mMol) of cyclohexylisocyanide were quickly admixed therewith. Moisture was excluded from the reaction. The reaction mixture became slightly warm. After four days there was no trace of the odor of the isonitrile. The reaction mixture was poured into 60 cc. of a 15% caustic soda solution and vigorously shaken until any precipitate was dissolved. The organic phase was separated and the aqueous layer was extracted once with 40 cc. of chloroform. The organic phases were then blended and washed once with 30 cc. of a 15% caustic soda solution and once with 30 cc. of water. Then they were desiccated with calcined magnesium sulfate. The yellow solution was concentrated to thereby obtain 10.15 grams (96% of the total) of yellow needles having a melting point of 110.5–116° C. After recrystallizing them from a benzene solution, there was obtained 8.41 grams (80% of the total) of colorless thin needles having a melting point of 115.5–117.5° C. The pure substance melts at 116.5–118° C.

EXAMPLE 7

*Preparation of 1-Cyclohexyl-5-(Phenylhydroxymethyl) Tetrazole*

Eighty cc. of a 0.33 molar aluminum azide solution (80 mMol $N_3^-$) in tetrahydrofuran were mixed with 6.36 grams (50 mMol) of freshly distilled benzaldehyde. 5.45 grams (50 mMol) of cyclohexylisocyanide were rapidly admixed therewith. Moisture was carefully excluded from the reaction. In addition a few drops of boron fluoride etherate were added. In three days the odor of isonitrile had entirely vanished. The reaction mixture was poured into 60 cc. of a 15% caustic soda solution and vigorously shaken until all precipitate was dissolved. The organic phase was then separated and the aqueous layer extracted once with 40 cc. of chloroform. The organic phases were then blended and washed once with 30 cc. of a 15% caustic soda solution and once with 30 cc. of water. Then they were desiccated with calcined magnesium sulfate. After concentrating the yellow solution there was obtained 12.14 grams of yellow needles (94% of the total) having a melting point of 101–104° C. The raw product was crystallized from a mixture of benzene and cyclohexane to obtain 11.14 grams (86% of the total) of colorless needles having a melting point of 105.5–107.5° C. The pure substance, recrystallized from benzene, melts at 107.5–118.5° C.

EXAMPLE 8

*Preparation of 1-Cyclohexyl-5-(1'-Phenyl-1'-Hydroxy-1'-Ethyl) Tetrazole*

Eighty cc. of a 0.33 molar aluminum azide solution (80 mMol $N_3^-$) in tetrahydrofuran were mixed with 6.61 grams (50 mMol) of acetophenone and with 5.45 grams (50 mMol) of cyclohexylisocyanide and worked up in the manner described in Example 7. The reaction period extended over 14 days. Boron fluoride etherate was used as a catalyst. All the caustic soda solutions were extracted with chloroform.

The yield of raw product was 12.78 grams (94% of the total) having a melting point of 153–171° C. After recrystallizing the raw product from benzene there was obtained 9.26 grams (68% of the total) of colorless needles having a melting point of 178–181° C. The pure substance melts at 181–182° C.

EXAMPLE 9

*Preparation of 1-Benzyl-5-(1'-Hydroxy-2',2'-Dimethyl-3'-Dimethylamino-1'-Propyl) Tetrazole*

8.28 grams (50 mMol) of dimethylaminopival-aldehyde hydrochloride were dissolved in 30 cc. of dry chloroform and mixed with 80 cc. of a 0.33 molar aluminum azide solution (80 mMol $N_3^-$) in tetrahydrofuran. 5.86 grams (50 mMol) of benzylisocyanide were rapidly admixed therewith. All moisture was carefully excluded. The mixture was worked up as described in Examples 7 and 8. The reaction period extended over two days.

Yield: 14.06 grams (97% of the total) of yellow needles having a melting point of 93–99° C. These needles were recrystallized from a mixture of benzene and cyclohexane to obtain 11.88 grams of colorless needles (82% of the total) having a melting point of 99–101° C. The pure substance melts at 100.5–101.5° C.

EXAMPLE 10

*Preparation of 1-o,o'-Dimethylphenyl-5-(1'-Hydroxy-2', 2'-Dimethyl-3'-Dimethylamino-1'-Propyl) Tetrazole*

8.28 grams (50 mMol) of dimethylaminopival-aldehyde hydrochloride were dissolved in 30 cc. of dry chloroform and mixed with 80 cc. of a 0.33 molar aluminum azide solution (80 mMol $N_3^-$) in tetrahydrofuran and 6.56 grams (50 mMol) of 2,6-dimethylphenylisocyanide and worked up as described in Example 9. The reaction took 10 days.

Yield: 14.56 grams (96% of the total) of yellow needles having a melting point of 109–118° C. These needles were recrystallized from a mixture of benzene and cyclohexane to obtain 12.28 grams (81% of the total) of colorless needles having a melting point of 119–121° C. The pure substance melts at 123–124° C.

EXAMPLE 11

*Preparation of 2-Thioketo-4-Isopropyl-5-N-Cyclohexylimino-Oxazolidine*

A solution of 6 grams (61 mMol) of potassium thiocyanate in 15 cc. of water was mixed with 1.81 grams (25 mMol) of isobutyraldehyde and 2.725 grams (25 mMol) of cyclohexylisocyanide. After addition of 40 cc. of tetrahydrofuran the mixture became homogeneous. During a period of agitation and ice-cooling 3.8 cc. of concentrated hydrochloric acid (50 mMol) were added dropwise. Potassium chloride precipitated and was filtered with suction. The odor of isonitrile had disappeared. The filtrate was concentrated. The residue was taken up with 30 cc. of methylene chloride and then washed with sodium carbonate and water. It was desiccated with calcined magnesium sulfate and concentrated once more. There was obtained 4.36 grams of a reddish brown vitreous residue. This was rubbed while being heated with 20 cc. of ether. The resulting crystals were filtered by suction.

Yield: 1.25 grams (21% of the total). Melting point: 183–187° C. The crystals were recrystallized from benzene, whereby 1.02 grams (17% of the total) of a product were obtained having a melting point of 195–199° C. The pure substance melts at a temperature of 197–199° C.

What is claimed is:

1. A process for the preparation of a 1,5-disubstituted tetrazole which comprises mixing together in an inert solvent under anhydrous conditions (1) an organic isocyanide having the formula $R_3NC$, (2) a carbonyl compound having the formula

and (3) a nucleophilic reactant selected from the group consisting of hydrazoic acid and aluminum azide, and recovering from the reaction mixture a 1,5-disubstituted tetrazole having the formula

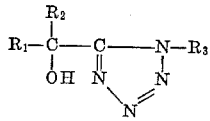

wherein $R_1$ is selected from the group consisting of hydrogen, lower alkyl, monocarbocyclic hydrocarbon aryl and monocarbocyclic hydrocarbon aryl lower alkyl; and $R_2$ is selected from the group consisting of hydrogen, lower alkyl, lower haloalkyl, lower hydroxyalkyl, lower aminoalkyl, lower mercaptoalkyl, lower aldehydoalkyl, monocarbocyclic hydrocarbon aryl lower alkyl, lower alkenyl, dimethylaminophenylethenyl, phenyl, pyridyl and benzothiazolyl; and $R_3$ is selected from the group consisting of lower alkyl, cycloalkyl, monocarbocyclic hydrocarbon aryl lower alkyl, monocarbocyclic hydrocarbon aryl, di lower alkyl aminophenyl and pyridyl.

2. A process for the preparation of 1-o,o'-dimethylphenyl-5-hydroxymethyltetrazole which comprises mixing together in an inert solvent under anhydrous conditions (1) 2,6-dimethylphenylisocyanide, (2) formaldehyde, and (3) hydrazoic acid, and recovering from the reaction mixture 1-o,o'-dimethylphenyl-5-hydroxymethyltetrazole.

3. A process for the preparation of 1-cyclohexyl-5-(1'-hydroxy-2'-methyl-1'-propyl) tetrazole which comprises mixing together in an inert solvent under anhydrous conditions (1) cyclohexylisocyanide, (2) isobutyraldehyde, and (3) hydrazoic acid, and recovering from the reaction mixture 1-cyclohexyl-5-(1'-hydroxy-2'-methyl-1'-propyl) tetrazole.

4. A process for the preparation of 1-cyclohexyl-5-(1'-hydroxy-2',2',2'-trichloro-1'-ethyl) tetrazole which comprises mixing together in an inert solvent under anhydrous conditions (1) cyclohexylisocyanide, (2) chloral, and (3) hydrazoic acid, and recovering from the reaction mixture 1-cyclohexyl-5-(1'-hydroxy-2',2',2'-trichloro-1'-ethyl) tetrazole.

5. A process for the preparation of 1-o,o'-dimethylphenyl-5-(1'-hydroxy-2',2',2'-trichloro-1'-ethyl) tetrazole which comprises mixing together in an inert solvent under anhydrous conditions (1) 2,6-dimethylphenylisocyanide, (2) chloral, and (3) hydrazoic acid, and recovering from the reaction mixture 1-o,o'-dimethylphenyl-5-(1'-hydroxy-2',2',2'-trichloro-1'-ethyl) tetrazole.

6. A process for the preparation of 1-p-diethylaminophenyl-5-(1'-hydroxy-2',2',2'-trichloro-1'-ethyl) tetrazole which comprises mixing together in an inert solvent under anhydrous conditions (1) p-diethylaminophenylisocyanide, (2) chloral, and (3) hydrazoic acid, and recovering from the reaction mixture 1-p-diethylaminophenyl-5-(1'-hydroxy-2',2',2'-trichloro-1'-ethyl) tetrazole.

7. A process for the preparation of 1-cyclohexyl-5-(1'-hydroxy-1'-methyl-1'-ethyl) tetrazole which comprises mixing together in an inert solvent under anhydrous conditions (1) cyclohexylisocyanide, (2) acetone, and (3) aluminum azide, and recovering from the reaction mixture 1-cyclohexyl-5-(1'-hydroxy-1'-methyl-1'-ethyl) tetrazole.

8. A process for the preparation of 1-cyclohexyl-5-(phenylhydroxymethyl) tetrazole which comprises mixing together in an inert solvent under anhydrous conditions (1) cyclohexylisocyanide, (2) benzaldehyde, and (3) aluminum azide, and recovering from the reaction mixture 1-cyclohexyl-5-(phenylhydroxymethyl) tetrazole.

9. A process for the preparation of 1-cyclohexyl-5-(1'-phenyl-1'-hydroxy-1'-ethyl) tetrazole which comprises mixing together in an inert solvent under anhydrous conditions (1) cyclohexylisocyanide, (2) acetophenone, and (3) aluminum azide, and recovering from the reaction mixture 1-cyclohexyl-5-(1'-phenyl-1'-hydroxy-1'-ethyl) tetrazole.

10. A process for the preparation of 1-benzyl-5-(1'-hydroxy-2',2'-dimethyl-3'-dimethylamino-1'-propyl) tetrazole which comprises mixing together in an inert solvent under anhydrous conditions (1) benzylisocyanide, (2) dimethylaminopivaldehyde hydrochloride, and (3) aluminum azide, and recovering from the reaction mixture 1-benzyl - 5 - (1' - hydroxy - 2',2' - dimethyl - 3' - dimethylamino-1'-propyl) tetrazole.

11. A process for the preparation of 1-o,o'-dimethylphenyl - 5 - (1' - hydroxy - 2',2' - dimethyl - 3' - dimethylamino-1'-propyl) tetrazole which comprises mixing together in an inert solvent under anhydrous conditions (1) 2,6-dimethylphenylisocyanide, (2) dimethylaminopivaldehyde hydrochloride, and (3) aluminum azide, and recovering from the reaction mixture 1-o,o'-dimethylphenyl - 5 - (1' - hydroxy - 2',2' - dimethyl - 3' - dimethylamino-1'-propyl) tetrazole.

References Cited in the file of this patent

UNITED STATES PATENTS

| 1,599,493 | Schmidt | Sept. 14, 1926 |
| 2,029,799 | Schmidt | Feb. 4, 1936 |

FOREIGN PATENTS

| 250,897 | Great Britain | Dec. 2, 1926 |

OTHER REFERENCES

Oliveri-Mandala: Chem. Abstracts, vol. 4, p. 2455 (1910).

Oliveri-Mandala: Gazz. Chim., vol. 40, II, pp. 441–4 (1911).

Adams et al.: "Organic Reactions" (Wiley), vol. 3, pp. 318–19, 322, 327–8 (1946).